US009129610B2

(12) United States Patent
Mulvey et al.

(10) Patent No.: US 9,129,610 B2
(45) Date of Patent: Sep. 8, 2015

(54) FILTERING FOR DETECTION OF LIMITED-DURATION DISTORTION

(75) Inventors: James Mulvey, Reading, MA (US); Joseph Gaalaas, Brighton, MA (US)

(73) Assignee: Bose Corporation, Framingham, MA (US)

( * ) Notice: Subject to any disclaimer, the term of this patent is extended or adjusted under 35 U.S.C. 154(b) by 412 days.

(21) Appl. No.: 13/590,675

(22) Filed: Aug. 21, 2012

(65) Prior Publication Data

US 2014/0056440 A1 Feb. 27, 2014

(51) Int. Cl.
*H04B 15/00* (2006.01)
*G10L 21/057* (2013.01)

(52) U.S. Cl.
CPC .................................... *G10L 21/057* (2013.01)

(58) Field of Classification Search
CPC ............ G10L 21/0208; G10L 21/0216; G10L 21/2024; G10L 21/0232
USPC .................................. 381/94.1–94.9; 700/94
See application file for complete search history.

(56) References Cited

U.S. PATENT DOCUMENTS

| | | | | |
|---|---|---|---|---|
| 6,192,227 | B1 * | 2/2001 | Tenny | 455/295 |
| 6,600,794 | B1 * | 7/2003 | Agarossi et al. | 375/341 |
| 6,625,235 | B1 * | 9/2003 | Coker et al. | 375/341 |
| 7,054,453 | B2 * | 5/2006 | Causevic et al. | 381/94.1 |
| 2006/0177797 | A1 * | 8/2006 | Costello et al. | 434/29 |
| 2007/0213621 | A1 | 9/2007 | Reisfeld et al. | |
| 2009/0103750 | A1 | 4/2009 | Chilakapati et al. | |
| 2009/0137212 | A1 * | 5/2009 | Belotserkovsky | 455/77 |
| 2009/0196435 | A1 | 8/2009 | Miao | |
| 2010/0188155 | A1 | 7/2010 | Nielsen | |

OTHER PUBLICATIONS

International Search Report and Written Opinion dated Feb. 13, 2014 for PCT/US2013/055174.

Rangayyan et al: “Biomedical Signal Analysis—A Case-Study Approach”, Jan. 1, 2002, Biomedical Signal Analysis, John Wiley & Sons, 2PP, XXI-XXVIII, XP002639797, ISBN: 978-0-471-20811-2 p. 204-205.

* cited by examiner

*Primary Examiner* — Simon Sing
(74) *Attorney, Agent, or Firm* — Bose Corporation

(57) ABSTRACT

Processing a signal includes: receiving data that includes an input signal; filtering the input signal to generate a filtered signal, such that if the input signal includes at least one instance of a nonlinear distortion of a desired signal then the filtered signal includes a signature signal corresponding to the nonlinear distortion, the nonlinear distortion characterized by a time duration that is within a predetermined range; and detecting whether or not the filtered signal includes the signature signal.

35 Claims, 11 Drawing Sheets

FILTERING FOR DETECTION OF LIMITED-DURATION DISTORTION

BACKGROUND

This description relates to filtering for detection of limited-duration distortion.

Various signal processing techniques can be used for noise reduction of signals that may have been distorted in certain ways due to noise sources. In some cases, the distortion corresponds to additive noise, such that an undesired noise signal is added to a desired signal to produce a signal that may still resemble the desired signal but has certain distortions caused by the added noise signal. When the noise signal has characteristics that enable it to be distinguished from the desired signal, certain techniques can be applied to reduce the distortions. For example, if the noise signal has a frequency spectrum that is concentrated in a frequency range that is higher or lower than the frequency spectrum of the desired signal, frequency filtering (e.g., high-pass or low-pass filtering) can be used to reduce the amplitude of the noise components of the distorted signal without substantially reducing the amplitude of the desired components of the distorted signal. In some cases, the distortion is linear, such that a linear filter (e.g., a frequency filter) could be used to reverse the distortion applied to the desired signal (if the characteristics of such a filter were known). Nonlinear distortion typically cannot be completely reversed by application of a linear filter.

SUMMARY

In one aspect, in general, processing an input signal includes determining the presence of a predetermined signature in the processed input signal, in a frequency range in which a desired signal (e.g., an original signal being transmitted via the input signal) has no energy or relatively low energy, to detect a corresponding limited-duration nonlinear distortion of the desired signal. The processing can include, for example, linear filtering of the input signal. Determining the presence of the predetermined signature can include identifying a particular shape over a particular duration in the processed input signal. After the presence and location of the nonlinear distortion is located, techniques can be used to reduce or eliminate the nonlinear distortion.

In another aspect, in general, a method for processing a signal includes: receiving data that includes an input signal; filtering the input signal to generate a filtered signal, such that if the input signal includes at least one instance of a nonlinear distortion of a desired signal then the filtered signal includes a signature signal corresponding to the nonlinear distortion, the nonlinear distortion characterized by a time duration that is within a predetermined range; and detecting whether or not the filtered signal includes the signature signal.

In another aspect, in general, an apparatus for processing a signal includes: an input interface configured to receive data that includes an input signal; at least one processor configured to process the input signal. The processing includes filtering the input signal to generate a filtered signal, such that if the input signal includes at least one instance of a nonlinear distortion of a desired signal then the filtered signal includes a signature signal corresponding to the nonlinear distortion. The nonlinear distortion is characterized by a time duration that is within a predetermined range. The processing also includes detecting whether or not the filtered signal includes the signature signal.

Aspects can include one or more of the following features.

The time duration corresponds to a predetermined number of samples of the input signal.

The predetermined number of samples is a single sample.

The nonlinear distortion corresponds to the predetermined number of samples being absent from the input signal between adjacent samples of the input signal.

The nonlinear distortion corresponds to the predetermined number of samples with approximately the same amplitude being repeated in succession within the input signal.

Filtering the input signal comprises applying a linear filter to a series of samples of the input signal.

The linear filter is based on a transform that is evaluated at a predetermined frequency.

The filtered signal is based on successive values of the transform evaluated at the predetermined frequency for different respective subsets of the series of samples.

The filtered signal is based on the successive values of the transform filtered with a high-pass filter.

The signature signal is characterized by a time duration that is within a predetermined range.

The time duration of the signature signal corresponds to a predetermined number of samples of the filtered signal.

Detecting whether or not the filtered signal includes the signature signal comprises applying a matched filter to the filtered signal.

The matched filter comprises a series of samples that includes a repeating pattern having a period of two samples.

The signature signal indicates that the nonlinear distortion is associated with a frequency in a predetermined region of a spectrum of the input signal.

The desired signal has a spectrum with signal energy predominantly outside of the predetermined region of the spectrum of the input signal.

The predetermined region of the spectrum of the input signal comprises a region that includes a frequency corresponding to a sampling rate associated with the input signal.

Compensation is applied to the input signal based on detecting whether or not the filtered signal includes the signature signal to provide a processed input signal to an output interface.

The compensation comprises inserting a predetermined number of samples between adjacent samples of the input signal to provide the processed input signal.

Inserting the predetermine number of samples comprises interpolating amplitudes of the predetermined number of samples based on amplitudes of the adjacent samples.

The compensation comprises removing a predetermined number of samples with approximately the same amplitude repeated in succession within the input signal to provide the processed input signal.

The compensation comprises locating a sample of the input signal associated with onset of the signature signal in the filtered signal.

The compensation comprises comparing amplitudes of samples in proximity to the located sample to determine whether the nonlinear distortion corresponds to: a predetermined number of samples with approximately the same amplitude being repeated in succession within the input signal, or a predetermined number of samples being absent from the input signal between adjacent samples of the input signal.

Providing the processed input signal to the output interface comprises applying asynchronous sample rate conversion to the compensated input signal.

The received data comprises a portion of a streamed signal.

The output interface comprises a speaker.

The data is received over a wireless receiver.

The data is received from a storage device.

Aspects can have one or more of the following advantages.

The signal processing techniques described herein enable audio artifacts caused by certain types of nonlinear distortion to be reduced or eliminated. Some nonlinear distortion arises due to limited-duration distortions of a digital audio signal. For example, some systems for streaming digital audio signals (e.g., over a wireless network) introduce errors that result in a digital audio receiver occasionally receiving an extra sample in the digital audio stream that is a repeat of an adjacent previous sample, and which was not present in the original digital audio signal. Another type of error that may be introduced results in the digital audio receiver occasionally receiving a digital audio stream that is missing a sample that was present in the original digital audio signal.

These missing or repeated sample errors can manifest as artifacts such as a clicking or ticking noise that can be heard on top of the content (e.g., music) of the original digital audio signal. The desired original digital audio signal can be recovered if missing or repeated samples can be reliably detected. Signal processing techniques, as described in more detail below, can be used to detect the presence of limited-duration nonlinear distortions such as these missing or repeated sample errors, and to determine the location of specific samples to be corrected. Other types of limited-duration nonlinear distortions that can be detected include phase discontinuities in sinusoidal waveforms (e.g., in audio signals or communication system carrier waveforms), or distortions due to clock-jitter, for example. The signal processing techniques used in a module of an audio system can improve the quality of the sound reproduced by the system. The signal processing techniques can also be used in various types of devices or modules that transform signals, such as asynchronous sample rate converters or analog-to-digital converters, and for various types of applications such as digital audio watermarking or recursive improvements to sample interpolation.

Other features and advantages of the invention are apparent from the following description, and from the claims.

DESCRIPTION

The techniques described below for processing signals can be used in any of a variety of devices and systems that transport and/or play digital audio signals. Some devices play audio signals from digital data that has been stored locally. In some systems, the audio signals are transported as a stream from a transmitter device to one or more receiver devices in a distributed system.

Figure 1:
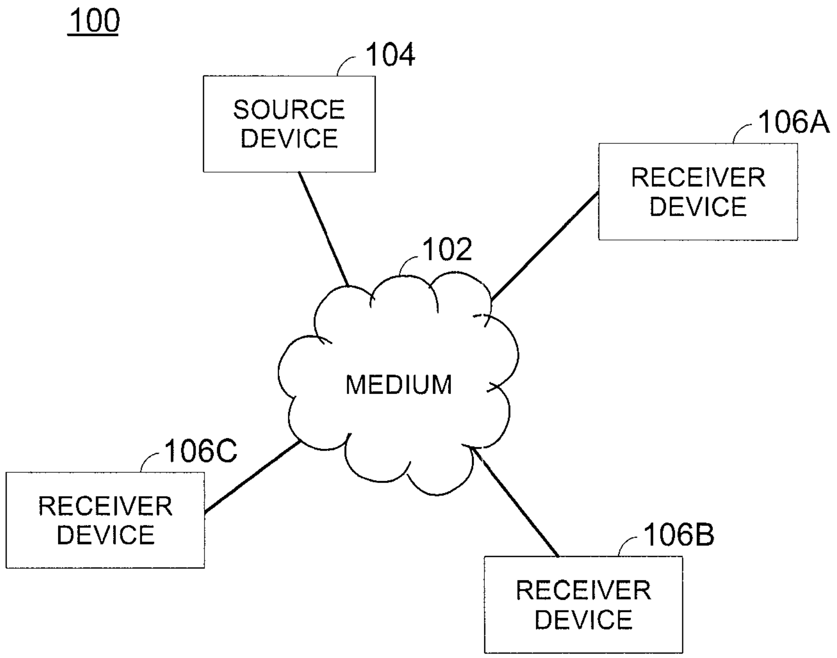
FIG. 1 is a block diagram of a distributed system.

Referring to FIG. 1, a distributed system 100 includes multiple devices that are each configured to communicate over a shared communication medium 102. For example, in a wireless network, each device includes an antenna for transmitting and receiving radio frequency (RF) electromagnetic waves. In a centralized network, devices communicate via an access point. In a peer-to-peer network, communication can occur between devices without requiring a central access point. In the system 100, a source device 104 streams data that includes samples of a digital audio signal to one or more receiver devices 106A-106C. For example, in a music system, the source device 104 may broadcast music from a source (e.g., a storage device or an internet stream) that provides the music as an uncorrupted digital audio signal. The receiver devices 106A-106C may include speakers to play the music. At some point before a receiver device plays the music (e.g., during transmission from the source device 104 or during reception at a receiver device), the digital audio signal may be susceptible to corruption including the missing or repeated sample error described above. In particular, the corruption may have been due to a protocol that is used by a device communication interface. For example, the system 100 may be configured to use a standardized protocol for transport of digital audio streams for compatibility with various kinds of devices.

Figure 2:
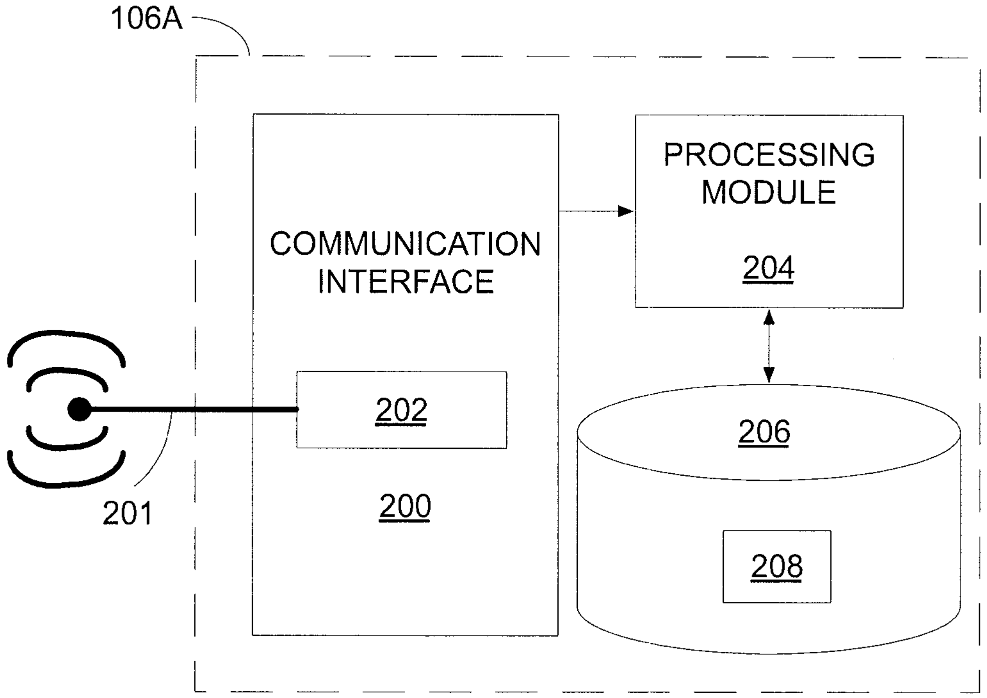
FIG. 2 is a block diagram of a device in the distributed system.

Referring to FIG. 2, an example of a receiver device 106A includes a communication interface 200 that includes transceiver circuitry that modulates and demodulates signals on RF waveforms transmitted from and received by an antenna 201. The communication interface 200 includes digital signal processing circuitry 202 that is configured to provide data that includes samples of a digital audio signal. The communication interface 200 is coupled to a processing module 204 that processes the samples to detect and correct any distortions in the provided audio signal. For example, some implementations of the processing module 202 include one or more processors that execute programs for controlling various features of the device 106A, coupled to a memory system 206 (e.g., including volatile memory, non-volatile memory, or both). In some implementations, the device 106A is part of an audio system that includes a speaker for playing the corrected audio signal, or another form of output interface for outputting the corrected audio signal. Information that may be stored in the memory system 206 includes filter information 208 that defines parameters for filtering the audio signal to detect and correct any distortions.

When an audio signal contains a distortion, various factors determine whether or not that distortion will be audible. Generally, the distortion due to a missing or repeated sample is most audible when the audio signal is dominated by a sustained note with a dominant fundamental frequency approximately 800 Hz or greater. The audibility also depends on the sample rate of the signal and the amplitude of the signal. The distortion becomes more audible as the time between adjacent samples becomes a more significant portion of the period of the sinusoidal waveform at the dominant fundamental frequency.

Figure 3A:
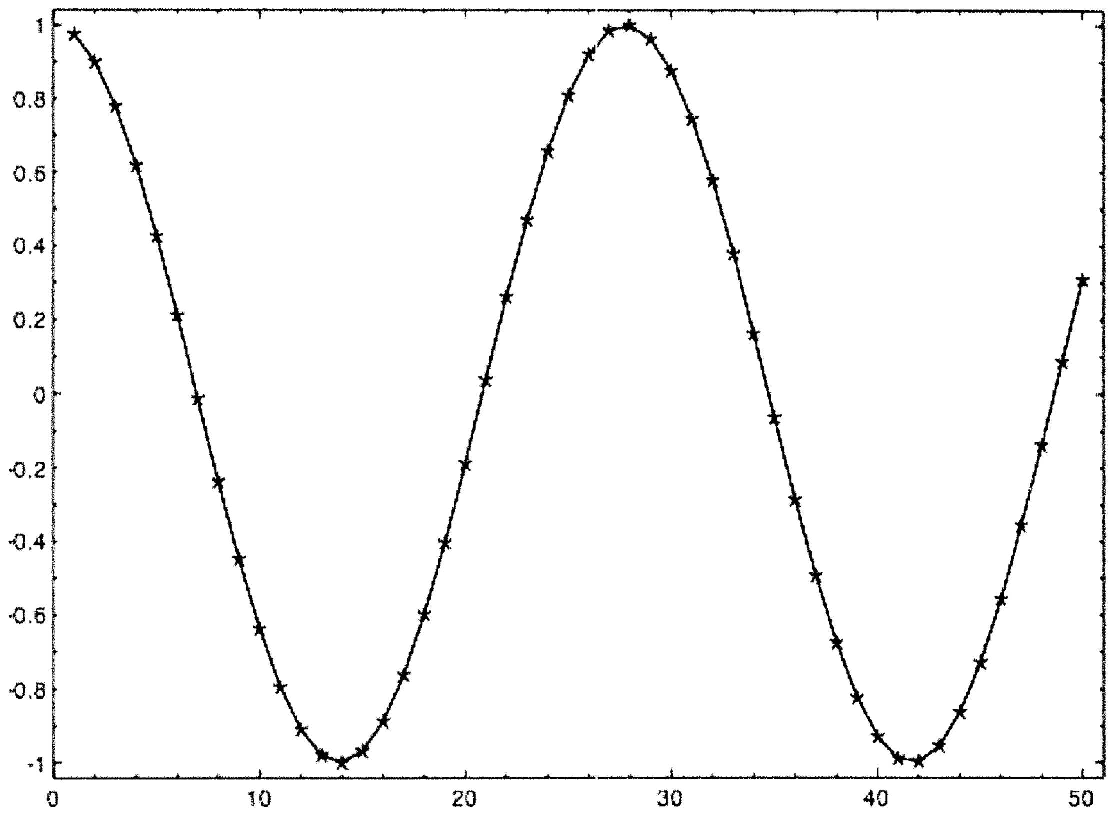
FIG. 3A is a plot of an undistorted (or original source) signal.
Figure 3B:
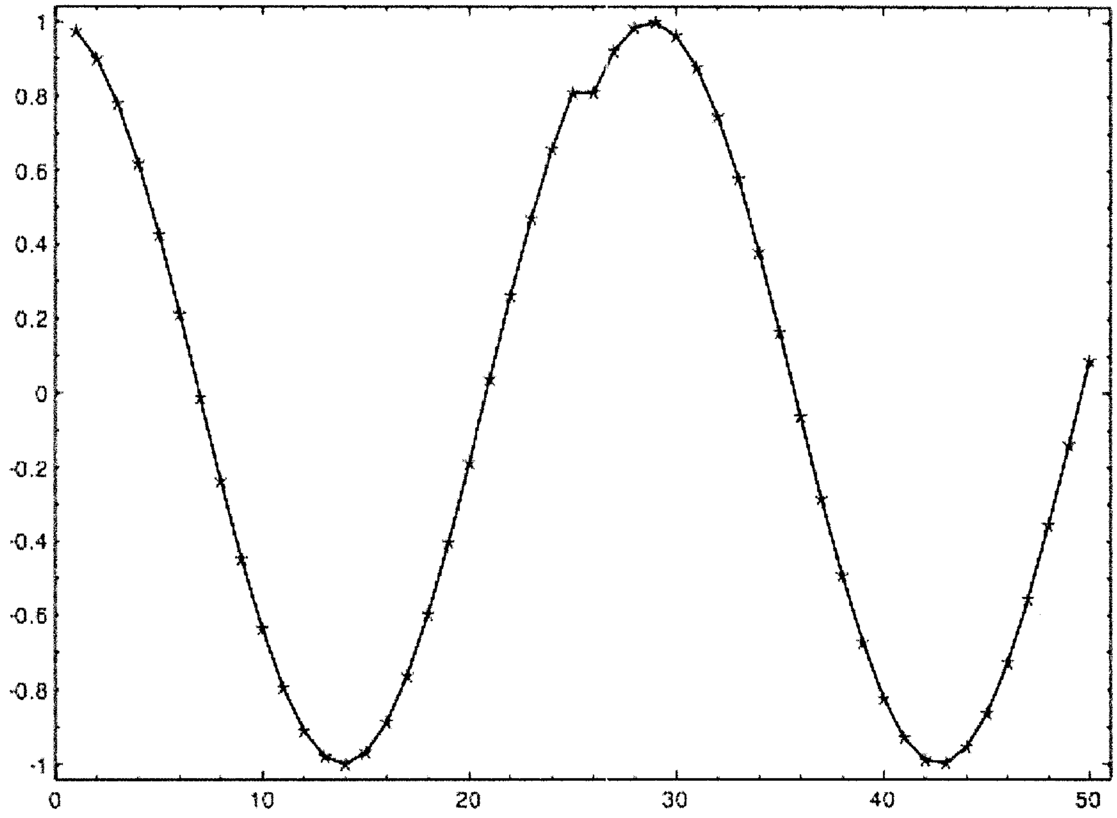
FIGS. 3B and 3C are plots of distorted versions of the signal in FIG. 3A.
Figure 3C:
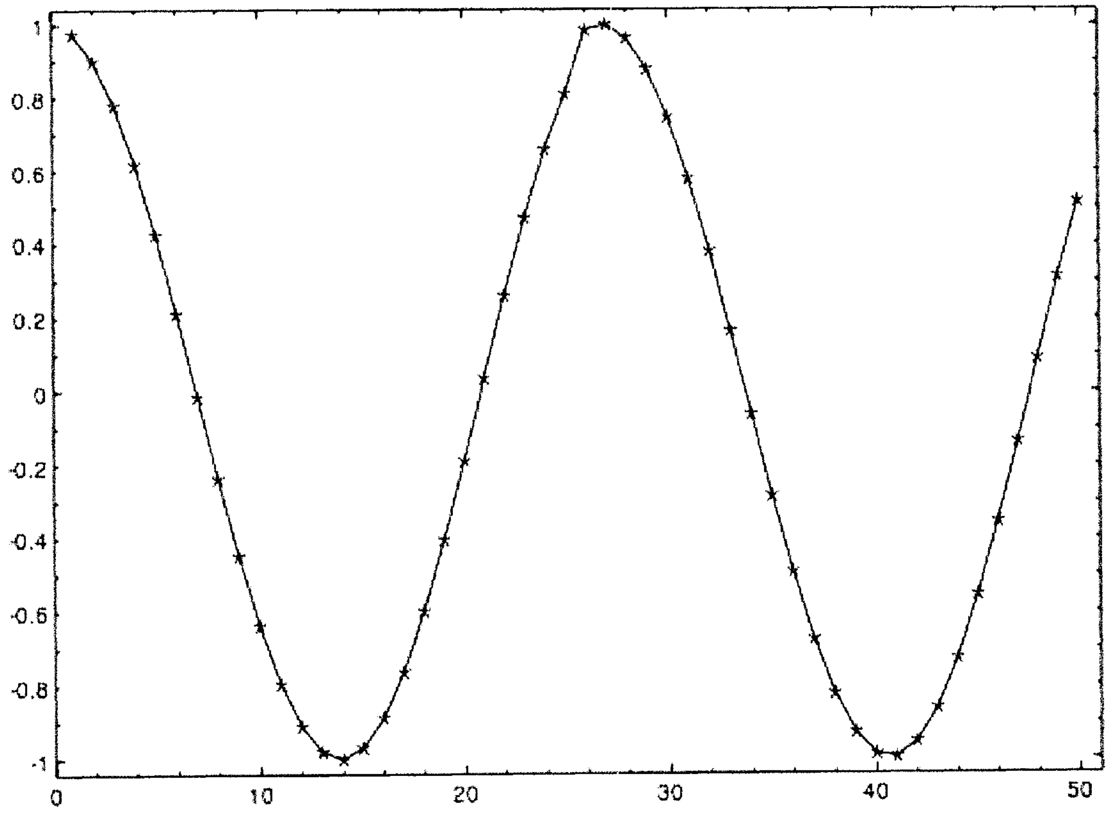

Any signal can be represented as a sum of sinusoidal waveforms at different frequencies. Over a period of one of these sinusoidal waveforms represented by N samples, the phase changes monotonically by $(360/N)^\circ$ per sample. FIG. 3A shows an example of 100 samples of a signal corresponding to an ideal sinusoidal waveform, where one period is about 28 samples long (with samples marked by "*" and adjacent samples connected by a line). If the waveform is not perfectly sinusoidal due to a single repeated sample, there is no change in phase between adjacent samples (a phase difference of $0^\circ$) at the location of the repeated sample. FIG. 3B shows an example of 100 samples of a signal corresponding to a distorted sinusoidal waveform with a repeated sample (samples 25 and 26 are repeated). If the waveform is not perfectly sinusoidal due to a single missing sample, there is a change in phase between adjacent samples immediately before and after the missing sample of $(720/N)^\circ$. FIG. 3C shows an example of 100 samples of a signal corresponding to a distorted sinusoidal waveform with a missing sample (between samples 25 and 26). The missing sample would have had an amplitude that corresponds to the amplitude of sample 26 of the ideal waveform of FIG. 3A.

These discontinuities in the phase relative to an ideal sinusoidal waveform can be detected using a linear filtering technique, which is described below for the case of a single missing or repeated sample. To illustrate aspects of the linear filtering to be performed by the module 204, the mathematical representations of an ideal signal and a distorted signal are shown below along with an analysis in the frequency domain using a discrete Fourier transform (DFT) of each signal.

The ideal sinusoidal signal can be expressed as follows.

$$x(n) = A\cos\left(\frac{2\pi k_0 n}{N} + \theta_0\right)$$

This is a time-dependent signal where the discrete time index variable n (for n=0 . . . N−1) represents successive samples in time that occur at multiples of a regular sampling interval, A is the amplitude, $k_0/N$ is the frequency of the sinusoid in cycles per sample, and $\theta_0$ is a constant phase shift. This sinusoidal signal, representing a dominant fundamental frequency within the spectrum of an input signal, is assumed to have been sampled at grater than the Nyquist rate such that $k_0<N/2$.

An N-point DFT of the ideal signal can be expressed as follows.

$$X_m(k) = \sum_{n=0}^{N-1} x(n+m)e^{-j\left(\frac{2\pi kn}{N}\right)}$$

DFTs of a time-dependent signal are frequency-dependent, where frequency corresponds to the discrete variable k (for k=0 . . . N−1), with the largest frequency corresponding to the Nyquist frequency k=N/2 (also known as the “Nyquist bin”). This DFT is also time-dependent, corresponding to performing the DFT operation over a window of N samples whose position relative to the signal x(n) shifts in time according to the discrete time index variable m. The DFT calculation can be updated as new samples of the signal x(n) are received. As each new sample of the signal x(n) is received, the DFT $X_m(k)$ is calculated based on a new set of samples with one old sample sliding out of the window and one new sample sliding into the window.

The distorted signal with a missing sample can be expressed as follows.

$$x(n) = \begin{cases} A\cos\left(\frac{2\pi k_0 n}{N} + \theta_0\right); & n < N_0 \\ A\cos\left(\frac{2\pi k_0 (n+1)}{N} + \theta_0\right); & n \geq N_0 \end{cases}$$

In this example, there is a single missing sample within the window of N samples over which the DFT is calculated. The missing sample occurs between the values of $n=N_0-1$ and $n=N_0$. The DFT of the distorted signal can be expressed as shown above, except with this new value of x(n). The DFT of the ideal signal will be denoted as $X_m(k)$, and the DFT of the distorted signal will be denoted as $X'_m(k)$. As the window over which the DFT $X'_m(k)$ is calculated slides in time, the value of $N_0$ progresses from N−1 to 0 (so $N_0=N-m-1$).

When the DFT is evaluated at a particular frequency (in this example, at the Nyquist bin k=N/2), there is a qualitative distinction between the resulting time-dependent DFT $X_m(k)$ of the ideal signal and the DFT $X'_m(k)$ of the distorted signal. The value of the DFT at the Nyquist bin can be efficiently calculated during signal processing as the difference between the sum of all even index samples and the sum of all odd-index samples.

For the ideal signal, the DFT at the Nyquist bin can be expressed as follows.

$$X_m\left(\frac{N}{2}\right) = A\frac{\sin \pi k_0}{\cos\frac{\pi k_0}{N}} \cdot IM\left\{e^{j\frac{2\pi k_0 m}{N}} \cdot e^{j\frac{\pi k_0 (N-1)}{N}} \cdot e^{j\theta_0}\right\}$$

For the distorted signal, the DFT at the Nyquist bin can be expressed as follows.

$$X'_m\left(\frac{N}{2}\right) = A \cdot IM\left\{e^{j\left(\frac{2\pi k_0 m}{N}+\theta_0\right)}\left[\left(1 + e^{j\frac{2\pi k_0 (N-m-1)}{N}}e^{j\pi m}\right)\tan\frac{\pi_{k_0}}{N} + \frac{\sin \pi k_0}{\cos\frac{\pi k_0}{N}}e^{j\frac{2\pi k_0}{N}}e^{j\pi k_0\left(\frac{N-1}{N}\right)}\right]\right\}$$

The function IM{ } takes the imaginary part of its argument. These expressions are based on the following additional assumptions. The value of the frequency variable k is assumed to be different from the value of the frequency constant $k_0$, which is true when $k_0$ is not an integer. The value of N is assumed to be an even integer.

A qualitative distinction between these two DFT signals is their dependence on successive values of the time variable m. For the distorted signal, the amplitude of the complex value whose imaginary part is extracted has same dependence on m as the ideal signal except for the following factor.

$$\left(1 + e^{j\frac{2\pi k_0 (N-m-1)}{N}}e^{j\pi m}\right)$$

This factor includes a term with a first m-dependent phase that varies as $$\frac{2\pi k_0}{N}$$

for each incremental change in m, and a second m-dependent phase that varies as π for each incremental change in m. Since $k_0<N/2$, the first phase varies more slowly with m than the second phase, which yields a value $e^{j\pi m}$ that changes back and forth between +1 and −1 as m goes from 0 to N−1. So, the amplitude of this factor oscillates with m under some envelope determined by the value of $k_0$. This oscillation signature signal has a predetermined length of N samples and can be detected using additional linear filtering (e.g., a high-pass filter and a matched filter). Since the DFT is also a linear filter, the total effect of the filtering can be applied by the module 204 using a single linear filter. In other examples, the moving DFT can be calculated at other frequency bins since the oscillation signature due to a missing (or repeated) sample is a wide-band distortion, but the Nyquist bin enables efficient detection if the spectrum of the input signal is band-limited below the Nyquist frequency.

In some implementations, the time-dependent DFT signal $X'_m$ $$\left(\frac{N}{2}\right)$$

is high-pass filtered to better isolate the oscillation signature that occurs at the Nyquist frequency of k/N=½ cycles per sample (or 1 cycle per 2 samples). The Nyquist component of the DFT signal extracted by high-pass filtering can be expressed as follows.

$$X_m'^{(HPF)}\left(\frac{N}{2}\right) = A \cdot \tan\frac{\pi k_0}{N} \cdot IM\left\{e^{j\left(\frac{2\pi k_0 (N-1)}{N}+\theta_0\right)} e^{j\pi m}\right\}$$

This component can be obtained, for example, by filtering the DFT signal using a $3^{rd}$ order high-pass filter with a zero cut-off frequency (i.e., a filter with three zeroes at the origin).

The oscillation signature can be detected using a matched filter consisting of samples that match the signature to be detected. For example, a matched filter $H_m=(-1)^m$ for $m=0 \ldots N-1$ can be used to detect the oscillation signature. (This particular matched filter also corresponds to performing another DFT operation evaluated at the Nyquist frequency.) The resulting detection signal is the convolution of the high-pass filtered signal with the matched filter, as follows.

$$X_m'^{(D)}\left(\frac{N}{2}\right) = X_m'^{(HPF)}\left(\frac{N}{2}\right) * H_m$$

If the input signature includes an instance of the missing or repeated sample distortion, then the detection signal will indicate the presence of the oscillation signature. In this example, where there is a single missing sample, the magnitude of the detection signal $$\left|X_m'^{(D)}\left(\frac{N}{2}\right)\right|$$

will include a signature signal comprising a series of values having a monotonic rise of length N followed by a monotonic fall of length N, with a single-sample local maximum in the middle (corresponding to the matched filter passing through the oscillation signature). When this signature signal is detected, the corrupted sample location is determined by subtracting (N+HPF_Order−1) from the time index at which the local maximum magnitude occurred. For example, with a DFT window of N=32 and a 3rd order high-pass filter, the value 34 is subtracted from the local maximum index to obtain the time index immediately following a missing sample or the time index of a repeated sample. Some limitations to reliable detection of the distortion may occur in some cases. For example, because only the imaginary portion of the complex argument is observed, there may be some limitations in some cases due to a blind spot and/or polarity uncertainty. In some cases, the frequency and phase of components of the input signal may lead to collapse of the oscillation signature.

Since the same signature signal occurs for either a missing sample or a repeated sample, the module 204 compares amplitudes of samples on either side of the time index to determine whether the distortion was caused by a missing sample or a repeated sample. The processing involved with correcting the detected distortion in the input signal depends on whether there was a missing or repeated sample. If the module 204 determines that there is a repeated sample in the input signal, the repeated sample at the determined time index is removed from the input stream before playing the processed input signal or sending the processed input signal to an output interface. If the module 204 determines that the input signal is missing a sample, the module 204 performs an interpolation process to insert a sample immediately before the determined time index. Any of a variety of interpolation techniques can be used. The selection of an interpolation method may depend on the processing resources of the module 204. In some implementations, the average of sample values on either side of the missing sample is used.

For nodes that receive a streamed signal from another node, the module 204 may also be configured to perform an asynchronous sample rate conversion (ASRC) on the processed signal to avoid a clock timing misalignment that may otherwise occur by removing or adding samples. Such a clock timing misalignment could also cause audio artifacts like clicking or popping. The ASRC processing would also ensure that a receiver node doesn't get too far ahead or behind if the addition or removal of samples to correct the missing or repeated sample errors build up over time resulting in a significant net increase or decrease in samples relative to a number of samples in a buffer, for example. This ASRC processing may be unnecessary for nodes that process a signal from a local storage medium.

Figure 4:
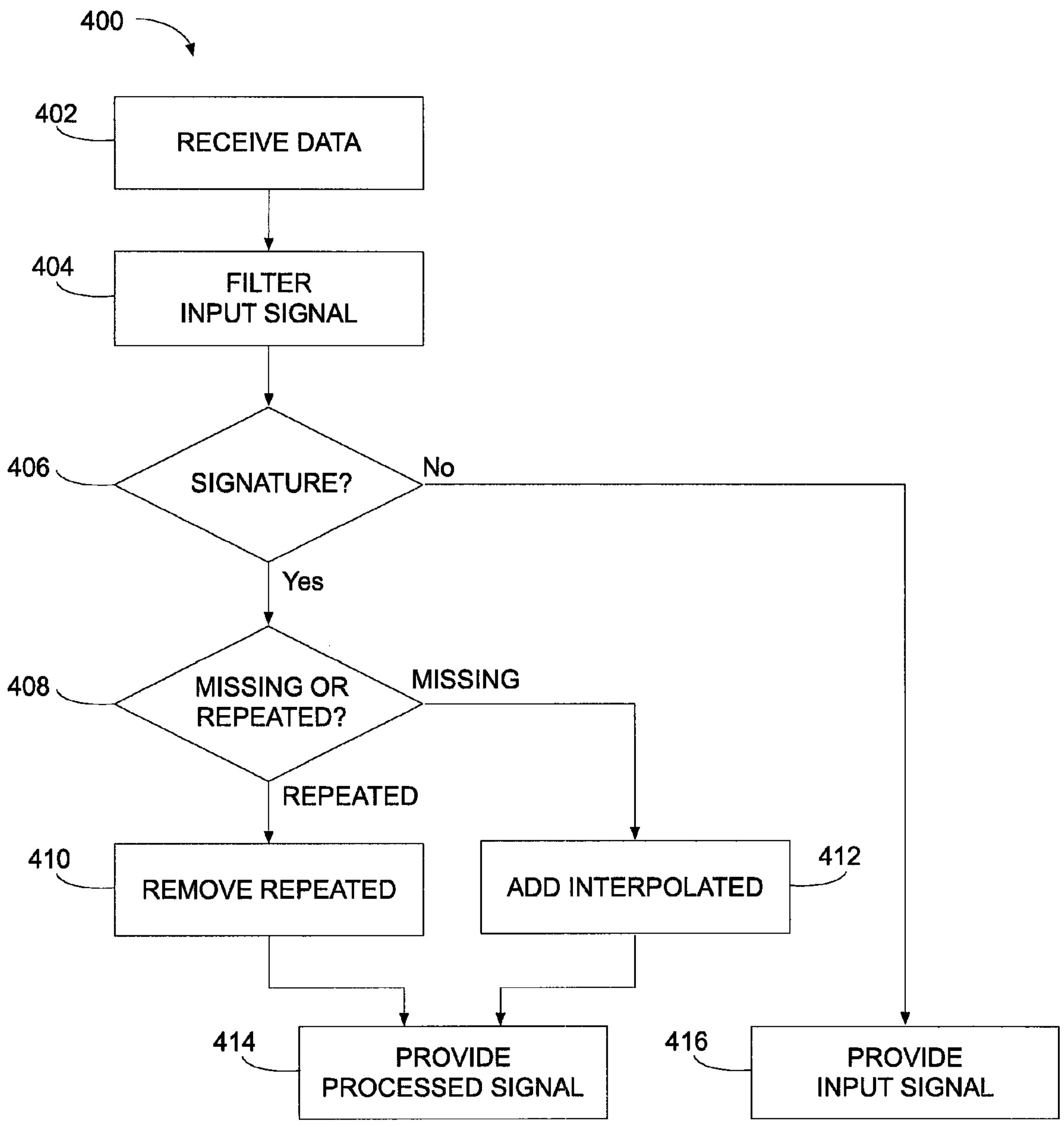
FIG. 4 is a flowchart of a procedure for processing distorted signals.

Referring to FIG. 4, an example of a signal processing procedure 400, performed at a receiver device, starts in response to receiving (402) data that includes an input signal. The receiver device filters (404) the input signal to generate a filtered signal, such that if the input signal includes at least one instance of a nonlinear distortion of a desired signal then the filtered signal includes a signature signal corresponding to the nonlinear distortion. For example, the filtered signal can be generated based on successive values of a transform evaluated at a predetermined frequency for different respective subsets of samples, and further filtered by a high-pass filter and a matched filter. The nonlinear distortion is characterized by a time duration (e.g., a time duration of missing or repeated samples) that is within a predetermined range (e.g., a single missing or repeated sample). The receiver device detects (406) whether or not the filtered signal includes the signature signal (e.g., by applying a matched filter to the filtered signal). If so, the receiver device determines (408) whether the nonlinear distortion corresponds to a missing sample or a repeated sample. The receiver device provides (414) a processed signal to an output interface, after removing (410) any repeated samples or adding (412) any interpolated missing samples, or provides (416) the input signal to the output interface if no processing was needed.

Figure 5A:
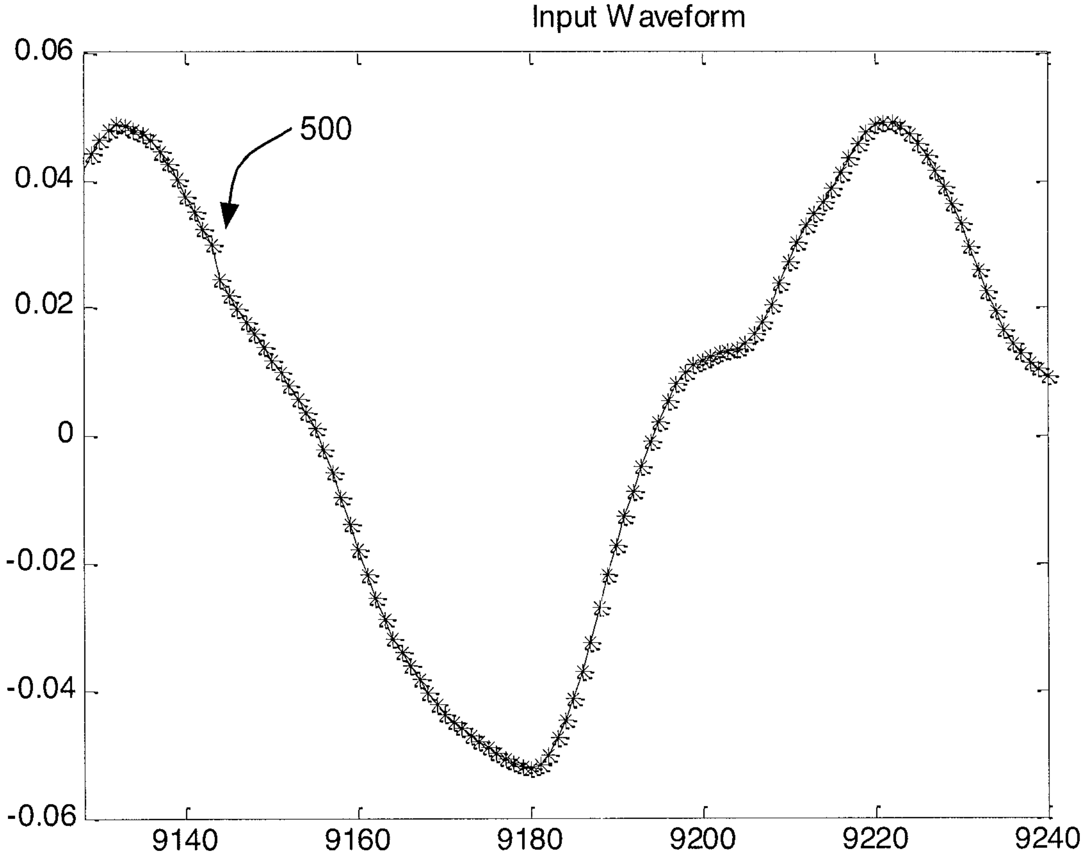
FIGS. 5A-5E are plots of different stages of processing a distorted signal.
Figure 5B:
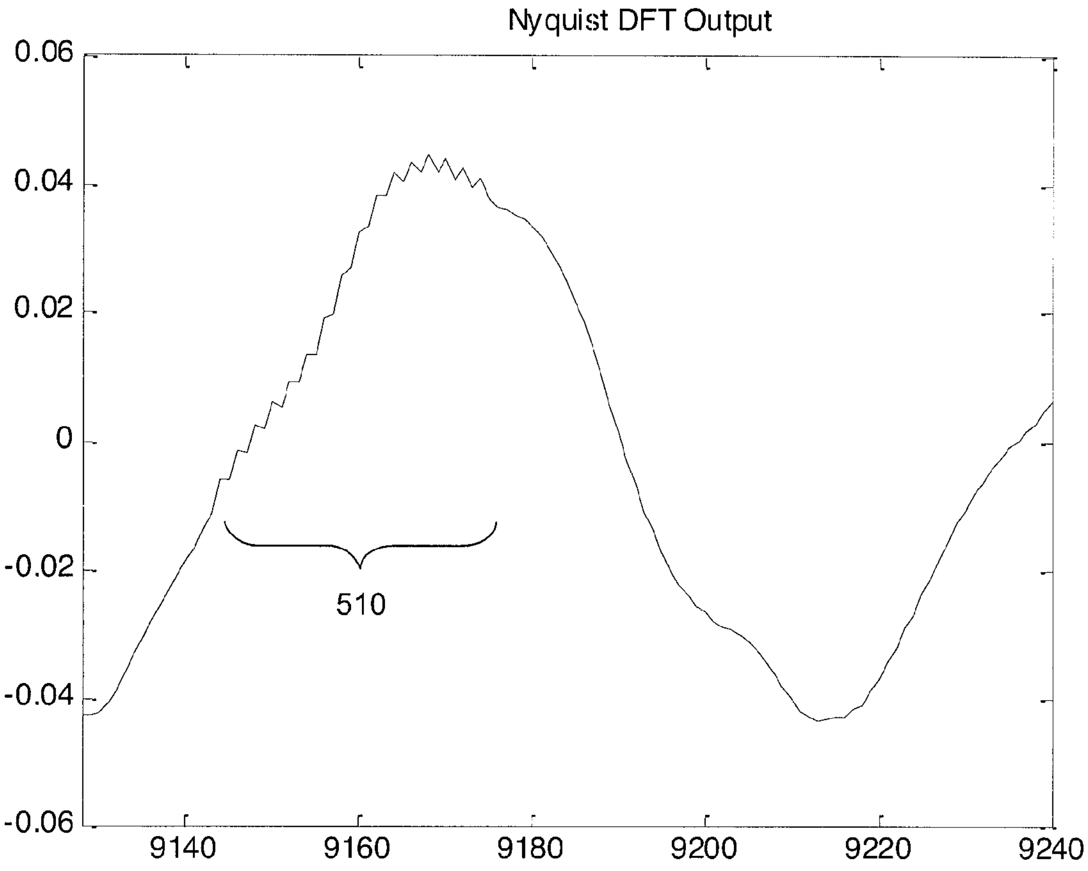
Figure 5C:
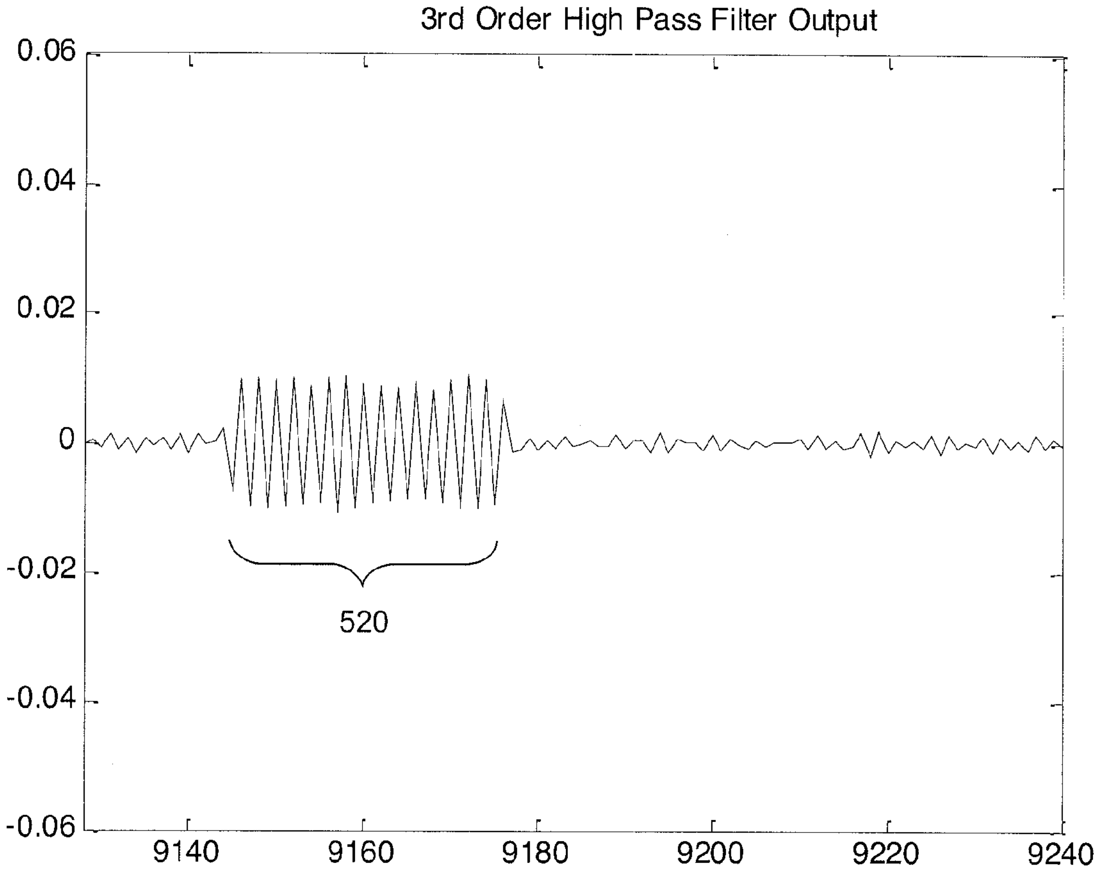
Figure 5D:
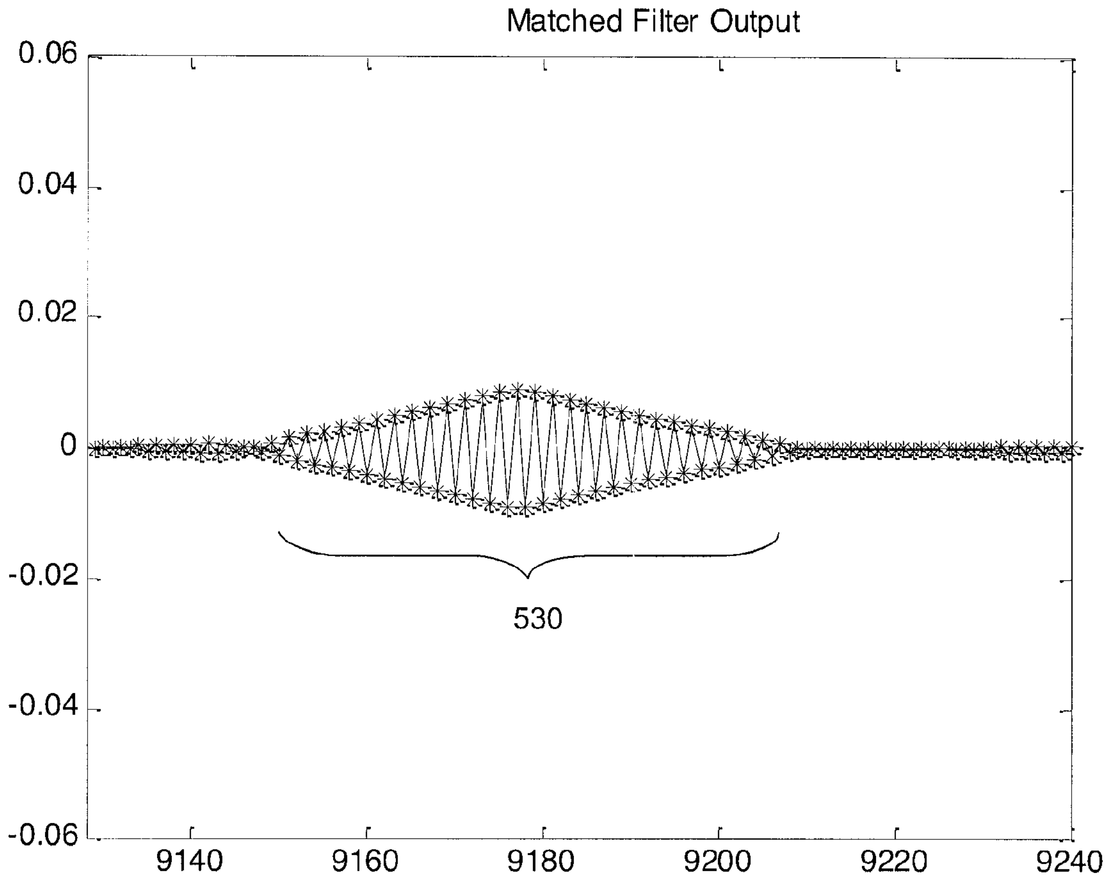
Figure 5E:
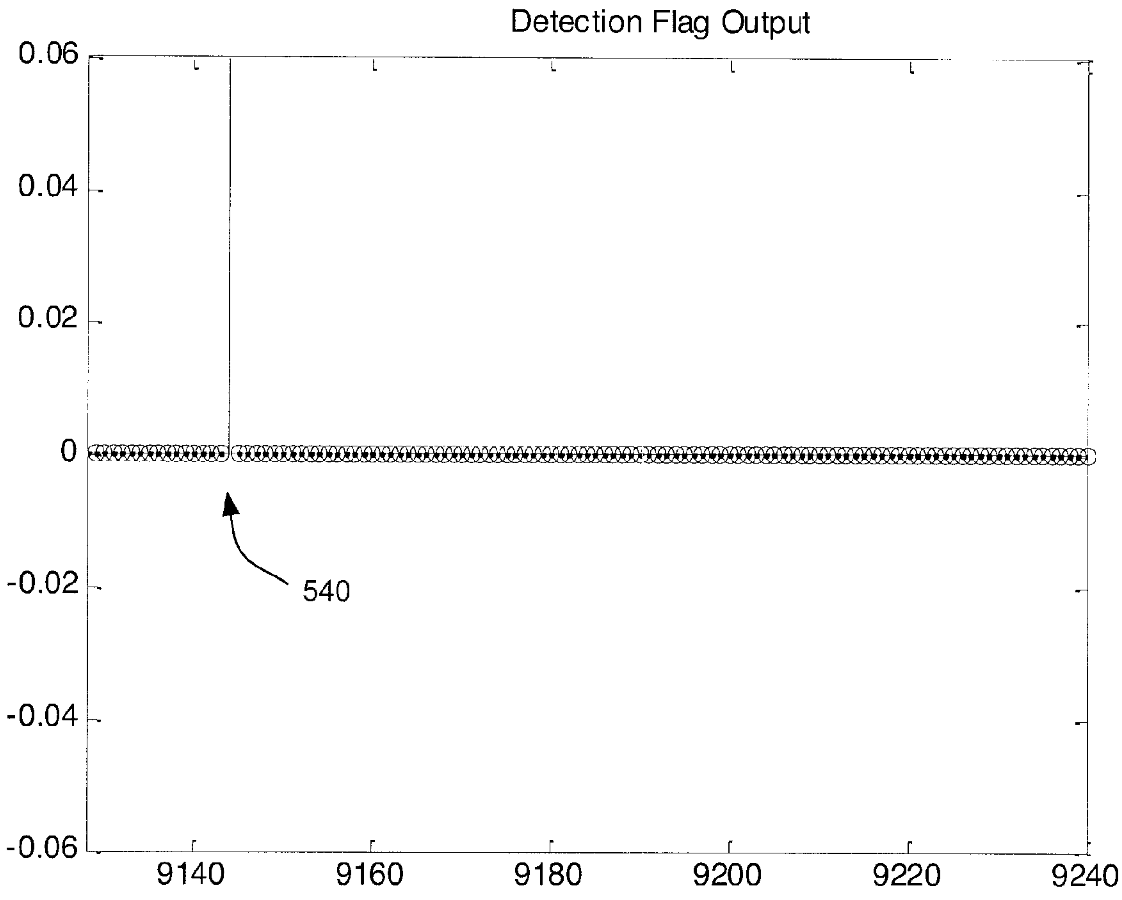

FIGS. 5A-5E show examples of plots of signals at various stages of the filtering process. FIG. 5A shows a portion of an input signal with a distortion 500 (a missing sample) at a particular time index $n_d$. FIG. 5B shows a DFT signal with an oscillation signature signal 510 occurring over a series of N=32 samples. FIG. 5C shows a high-pass filtered signal with an oscillation signature signal 520 occurring over a series of N=32 samples. FIG. 5D shows a matched filter output signal with a series of 64 samples 530 indicating detection of the oscillation signature signal 520. FIG. 5E shows a detection flag 540 occurring at the time index $n_d$ determined based on the onset of the rise of the series of samples 530 (after taking into account the order of the high-pass filter).

The techniques described above can be implemented using a program comprising instructions for execution on a device or module including one or more processors or other circuitry for executing the instructions. For example, the instructions execute procedures of software or firmware that runs on one or more programmed or programmable computing devices or modules including at least one processor and at least one data storage system (e.g., including volatile and non-volatile memory, and/or storage media). The programs may be provided on a computer-readable storage medium, such as a CD-ROM, readable by a general or special purpose programmable computer or delivered over a communication medium such as network to a computer where it is executed. Each such program may be stored on or downloaded to a storage medium (e.g., solid state memory or media, or magnetic or optical media) readable by a computing device, for configuring and operating the device when the storage medium is read by the device to perform the procedures of the program.

It is to be understood that the foregoing description is intended to illustrate and not to limit the scope of the invention, which is defined by the scope of the appended claims. Other embodiments are within the scope of the following claims.

What is claimed is:

1. A method for processing a signal, the method comprising:

receiving data that includes an input signal;

filtering the input signal to generate a filtered signal, wherein if the input signal includes at least one instance of a nonlinear distortion of a desired signal, then the filtered signal includes a signature signal corresponding to the nonlinear distortion, the nonlinear distortion being characterized by a time duration that is within a predetermined range; and detecting whether the filtered signal includes the signature signal, wherein detecting whether the filtered signal includes the signature signal comprises applying a matched filter to the filtered signal.

2. The method of claim 1, wherein the time duration corresponds to a predetermined number of samples of the input signal.

3. The method of claim 2, wherein the predetermined number of samples is a single sample.

4. The method of claim 2, wherein the nonlinear distortion corresponds to the predetermined number of samples being absent from the input signal between adjacent samples of the input signal.

5. The method of claim 2, wherein the nonlinear distortion corresponds to the predetermined number of samples with approximately the same amplitude being repeated in succession within the input signal.

6. The method of claim 1, wherein filtering the input signal comprises applying a linear filter to a series of samples of the input signal.

7. The method of claim 6, wherein the linear filter is based on a transform that is evaluated at a predetermined frequency.

8. The method of claim 7, wherein the filtered signal is based on successive values of the transform evaluated at the predetermined frequency for different respective subsets of the series of samples.

9. The method of claim 8, wherein the filtered signal is based on the successive values of the transform filtered with a high-pass filter.

10. The method of claim 1, wherein the signature signal is characterized by a time duration that is within a predetermined range.

11. The method of claim 10, wherein the time duration of the signature signal corresponds to a predetermined number of samples of the filtered signal.

12. The method of claim 1, wherein the matched filter comprises a series of samples that includes a repeating pattern having a period of two samples.

13. The method of claim 1, wherein the signature signal indicates that the nonlinear distortion is associated with a frequency in a predetermined region of a spectrum of the input signal.

14. The method of claim 13, wherein the desired signal has a spectrum with signal energy predominantly outside of the predetermined region of the spectrum of the input signal.

15. The method of claim 13, wherein the predetermined region of the spectrum of the input signal comprises a region that includes a frequency corresponding to a sampling rate associated with the input signal.

16. The method of claim 1, further comprising applying compensation to the input signal based on detecting whether the filtered signal includes the signature signal to provide a processed input signal to an output interface.

17. The method of claim 16, wherein the compensation comprises inserting a predetermined number of samples between adjacent samples of the input signal to provide the processed input signal.

18. The method of claim 17, wherein inserting the predetermine number of samples comprises interpolating amplitudes of the predetermined number of samples based on amplitudes of the adjacent samples.

19. The method of claim 16, wherein the compensation comprises removing a predetermined number of samples with approximately the same amplitude repeated in succession within the input signal to provide the processed input signal.

20. The method of claim 16, wherein the compensation comprises locating a sample of the input signal associated with onset of the signature signal in the filtered signal.

21. The method of claim 20, wherein the compensation comprises comparing amplitudes of samples in proximity to located sample to determine whether the nonlinear distortion corresponds to: a predetermined number of samples with approximately the same amplitude being repeated in succession within the input signal, or a predetermined number of samples being absent from the input signal between adjacent samples of the input signal.

22. The method of claim 16, wherein providing the processed input signal to the output interface comprises applying asynchronous sample rate conversion to the compensated input signal.

23. The method of claim 22, wherein the received data comprises a portion of a streamed signal.

24. The method of claim 16, wherein the output interface comprises a speaker.

25. The method of claim 1, wherein the data is received over a wireless receiver.

26. The method of claim 1, wherein the data is received from a storage device.

27. An apparatus for processing a signal, the apparatus comprising an input interface to receive data that includes an input signal; and at least one processor to process the input signal by performing operations comprising:

filtering the input signal to generate a filtered signal, wherein if the input signal includes at least one instance of a nonlinear distortion of a desired signal, then the filtered signal includes a signature signal corresponding to the nonlinear distortion, the nonlinear distortion being characterized by a time duration that is within a predetermined range, and detecting whether the filtered signal includes the signature signal, wherein detecting whether the filtered signal includes the signature signal comprises applying a matched filter to the filtered signal.

28. The apparatus of claim 27, wherein the time duration corresponds to a predetermined number of samples of the input signal.

29. The apparatus of claim 28, wherein the nonlinear distortion corresponds to the predetermined number of samples being absent from the input signal between adjacent samples of the input signal.

30. The apparatus of claim 28, wherein the nonlinear distortion corresponds to the predetermined number of samples with approximately the same amplitude being repeated in succession within the input signal.

31. The apparatus of claim 27, wherein filtering the input signal comprises applying a linear filter to a series of samples of the input signal, the linear filter being based on a transform that is evaluated at a predetermined frequency.

32. The apparatus of claim 27, wherein the signature signal indicates that the nonlinear distortion is associated with a frequency in a predetermined region of a spectrum of the input signal.

33. The apparatus of claim 27, wherein the operations further comprises applying compensation to the input signal based on detecting whether the filtered signal includes the signature signal to provide a processed input signal to an output interface.

34. The apparatus of claim 33, wherein providing the processed input signal to the output interface comprises applying asynchronous sample rate conversion to the compensated input signal.

35. The apparatus of claim 33, wherein the output interface comprises a speaker.

* * * * *